United States Patent

Shaffer et al.

[11] Patent Number: 5,841,778
[45] Date of Patent: Nov. 24, 1998

[54] SYSTEM FOR ADAPTIVE BACKOFF MECHANISMS IN CSMA/CD NETWORKS

[75] Inventors: Shmuel Shaffer, Palo Alto; William Joseph Beyda, Cupertino, both of Calif.

[73] Assignee: Siemens Business Communication Systems, Inc., Santa Clara, Calif.

[21] Appl. No.: 975,988

[22] Filed: Nov. 21, 1997

[51] Int. Cl.⁶ ........................................................ H04J 3/14
[52] U.S. Cl. ........................ 370/447; 370/470; 340/825.5
[58] Field of Search .................... 370/445, 446, 370/447, 448, 431, 437, 444, 449, 450, 451, 452, 454, 455, 458, 461, 462, 463, 352, 353, 354, 356, 465, 468, 470, 471, 472; 340/825.06, 825.16, 825.5, 825.51

[56] References Cited

U.S. PATENT DOCUMENTS

| | | |
|---|---|---|
| 4,332,027 | 5/1982 | Malcolm et al. . |
| 4,516,122 | 5/1985 | Tomikawa ............................... 370/447 |
| 4,623,886 | 11/1986 | Livingston . |
| 4,642,630 | 2/1987 | Beckner et al. . |
| 4,682,324 | 7/1987 | Ulug ........................................ 370/447 |
| 4,771,391 | 9/1988 | Blasbalg . |
| 4,819,229 | 4/1989 | Pritty et al. . |
| 5,265,094 | 11/1993 | Schmickler et al. ..................... 370/447 |
| 5,353,287 | 10/1994 | Kuddes et al. . |
| 5,453,987 | 9/1995 | Tran ........................................ 370/447 |
| 5,483,533 | 1/1996 | Kuba . |
| 5,485,147 | 1/1996 | Jaffe et al. ............................... 370/445 |
| 5,490,143 | 2/1996 | Hara et al. ............................... 370/447 |
| 5,517,501 | 5/1996 | Jacquet et al. . |
| 5,572,511 | 11/1996 | Ouyang et al. ........................... 370/445 |

*Primary Examiner*—Huy D. Vu

[57] ABSTRACT

A system for controlling traffic on a contention-based local area network (LAN) such as one according to the CSMA/CD or Ethernet specification. To selectively preempt low priority messages on the LAN so that high priority messages may be transmitted, the system uses a station profile table (260) that holds information relating to an average frame length for messages transmitted from each station on the LAN. When a station connected to the LAN through a network interface (250) needs to transmit a high priority message such as a voice communication, a traffic monitor (240) checks for a low priority message on the LAN. If a low priority message is detected, a station identifier, priority level, and length of frame already transmitted are determined, and an average frame length is read from the station profile table (260). If the length of frame already transmitted is less than a predetermined threshold, then a computing element (220) transmits the high priority message through the network interface (250) to the LAN, to force a collision. After waiting for a period shorter than the standard backoff period defined by the CSMA/CD specification, the high priority message is retransmitted.

13 Claims, 3 Drawing Sheets

SYSTEM FOR ADAPTIVE BACKOFF MECHANISMS IN CSMA/CD NETWORKS

FIELD OF THE INVENTION

This invention relates to the field of data communications, and more particularly, to local area networks that use a CSMA/CD bus access scheme.

BACKGROUND OF THE INVENTION

Local area networks (LANs) are networks interconnecting terminals, computers, work stations, and other intelligent systems within a building or a small number of buildings on a campus. LANs may be created using several different network topologies, but a commonly used one is a bus, in which all stations are connected to the same cable. By transmitting data on the bus, any two or more stations are able to communicate.

Standards for local area networks have been developed by the IEEE (Institute of Electrical and Electronics Engineers) through its committee 802 on local networking. One of the more popular standards for local area networks is IEEE standard 802.3 that defines a CSMA/CD (Carrier-Sense Multiple-Access/Collision Detect) bus, an example of which is the Ethernet specification. The basic concept underlying a CSMA/CD protocol is that all stations in the LAN listen for transmissions on the bus. When a station needs to transmit a message, it does so only when it detects that no other stations are transmitting. This is known as carrier sensing. However, since a number of stations exist on the LAN, collisions may still occur. Because stations are physically displaced from one another, two or more stations may concurrently sense that the no station is transmitting on the bus and begin transmitting, thereby causing a collision. When stations detect a collision, they transmit a special jam signal to notify all other stations of the collision and to abort their transmissions. After waiting for a backoff period as defined in the CSMA/CD specification, the stations may retransmit their messages. Due to the differing physical locations of the stations on the bus and propagation delays that occur for signals transmitted on the network bus, the jam signal will be detected at different times. Therefore, transmissions will be aborted at different times and retransmissions will be attempted after a backoff period, thereby avoiding another collision.

In addition to text and data messages, a LAN may also carry messages comprising real-time voice and/or video signals. These are high priority messages, comprising sequences of short frames, which in the conventional CSMA/CD environment, may be forced to wait behind long, low priority, message frames thereby resulting in a halting presentation, and generally undesirable results.

One prior art solution to this problem is to allow users to transmit high priority information regardless of whether a carrier signal from any other stations is present. Using this scheme, when a high priority user desires to transmit a message, the high priority user forces a collision on the line. When the collision is detected, and the transmissions aborted, the high priority user uses a shorter backoff time than the one agreed upon in the CSMA/CD standard, effectively bumping low priority traffic in all cases. However, this method works properly only when the network utilization is low. When loads are heavy, the low priority messages might never complete their transmissions from constantly being bumped by higher priority messages.

SUMMARY OF THE INVENTION

The present invention provides a modification to the CSMA/CD protocol, or any other contention-based local area network (LAN) protocol, that provides a more efficient allocation of network resources.

In accordance with the present invention, a system is provided to monitor the traffic of the network. Specifically, two main parameters are monitored: the lengths of the transmitted frames; and the number of bytes from the current frame that have already been transmitted to the network. The monitored parameters are then analyzed by a computing element to determine whether or not a collision is to be forced.

When there is a heavy load on the network, high priority messages such as real-time voice communication signals which are typically transmitted in 66-byte frames, may be forced to wait behind low priority text or data messages made up of long frames of many hundreds of bytes. When loads are heavy, it is desirable to allow the computing element to force a collision and bump a frame only if relatively few bytes of the frame have been transmitted. If more then a predetermined number of bytes have already been transmitted, the high priority frame will wait until the low priority transmission is successfully completed in order to avoid having to retransmit a long frame.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a system for use on contention-based local area networks (LANs) such as the CSMA/CD (Carrier-Sense Multiple-Access/Collision Detect) or Ethernet specifications. These specifications are industry-wide standards for local networking, and are considered well known to those of ordinary skill in the art of computer communications. An inventive data structure known as a station profile table is provided for use by the system to determine when a message on the LAN should be preempted in order to transmit a higher priority message.

Figure 1:
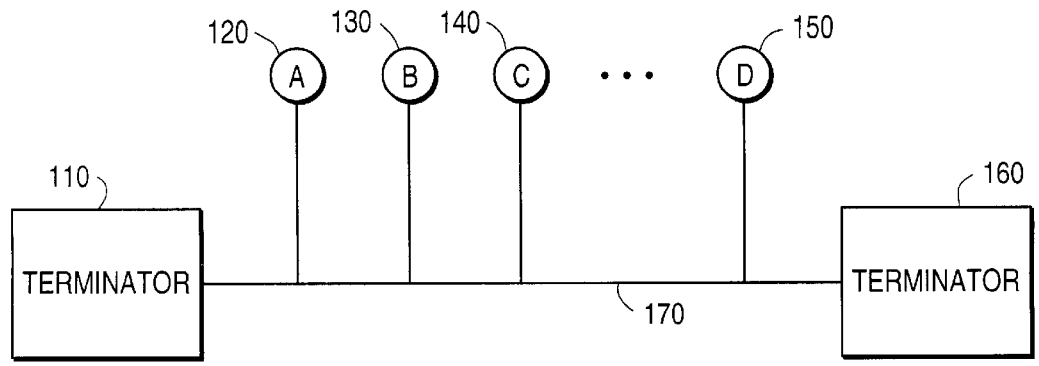
FIG. 1 is a schematic diagram depicting a typical contention-based local area network environment in which the present invention is used.

As shown in FIG. 1, a system according to the present invention operates in the environment of a contention-based local area network (LAN). The network comprises a network bus 170 having terminators 110 and 160 at either end, and having a plurality of computer stations 120–150 connected thereto. In a preferred embodiment, the LAN is constructed in accordance with the CSMA/CD or Ethernet specifications.

Figure 2:
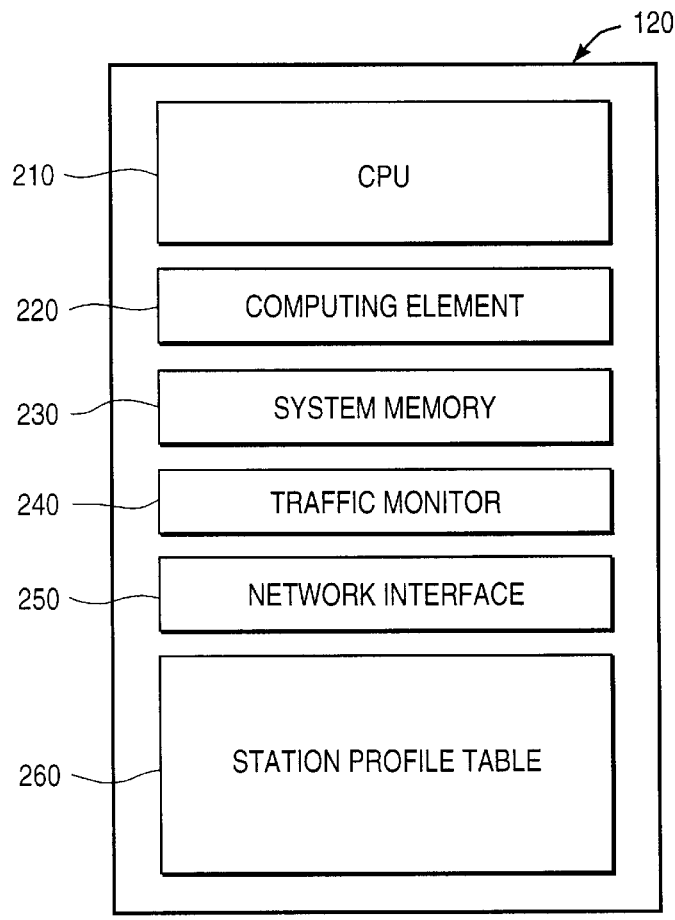
FIG. 2 is a functional block diagram of a currently preferred embodiment of the present invention.

Referring to FIG. 2, a typical computer station 120 for use with the invention is a general purpose computing device in the form of a conventional personal computer, having a central processing unit (CPU) 210, a system memory 230, a network interface 250 for connecting the station to the LAN, and other components not specifically shown in FIG. 2, such as a display, keyboard, mouse, etc. The network interface 250 will typically be implemented as a network interface card (NIC) in the computer station. As will be discussed in further detail below, the station 120 additionally includes a computing element 220, a traffic monitor 240, and a station profile table 260.

The traffic monitor 240 is used to monitor messages that are transmitted on the network bus. The traffic monitor preferably monitors such parameters as the length of message frames that are being transmitted on the network bus, an identifier of the station that is transmitting the message, and the priority level of the message. The traffic monitor may be implemented as hardware or software, either as part of the station itself or as part of a network interface card NIC).

The station profile table 260 is a data structure that is stored in either the system memory 230 located on the station 120 itself, or in a memory (not shown) of a network interface 250, or any other computer-readable medium, such as a magnetic disk, known in the art. An exemplary station profile table, as shown in Table 1 set forth below, includes fields for holding data representing an identifier of the station transmitting a message, the priority level of the message, and an average frame length for the message. In addition, the station profile table may optionally include a field for holding data representing a threshold value.

TABLE 1

Station Profile Table

| Station Identifier | Priority Level | Average Length | Threshold (%) |
|---|---|---|---|
| A | High | 75 | 50 |
| A | Low | 1500 | 80 |
| B | High | 100 | 50 |
| B | Low | 1000 | 80 |
| C | High | 66 | 50 |
| C | Low | 797 | 80 |

Before the station 120 transmits a message on the network, the network interface determines whether the network is free and if not, the computing element 220 determines whether the message currently being transmitted should be preempted. As will be explained in connection with FIG. 4, the computing element 220 analyzes the parameters that are monitored by the traffic monitor, and compares the parameters with information from the station profile table. When appropriate, the computing element transmits a message through the network interface to force a collision. As an alternative to transmitting a message to cause a collision, then waiting for the collision to be detected and a subsequent jam signal to be transmitted in order to abort a transmission, the computing element could simply transmit the jam signal to cause the message on the LAN to be aborted. The computing element may be implemented as hardware or software that is controlled by a processor within the network interface 250. Alternatively, the program code can be software that is executed by the CPU 210.

Figure 3:
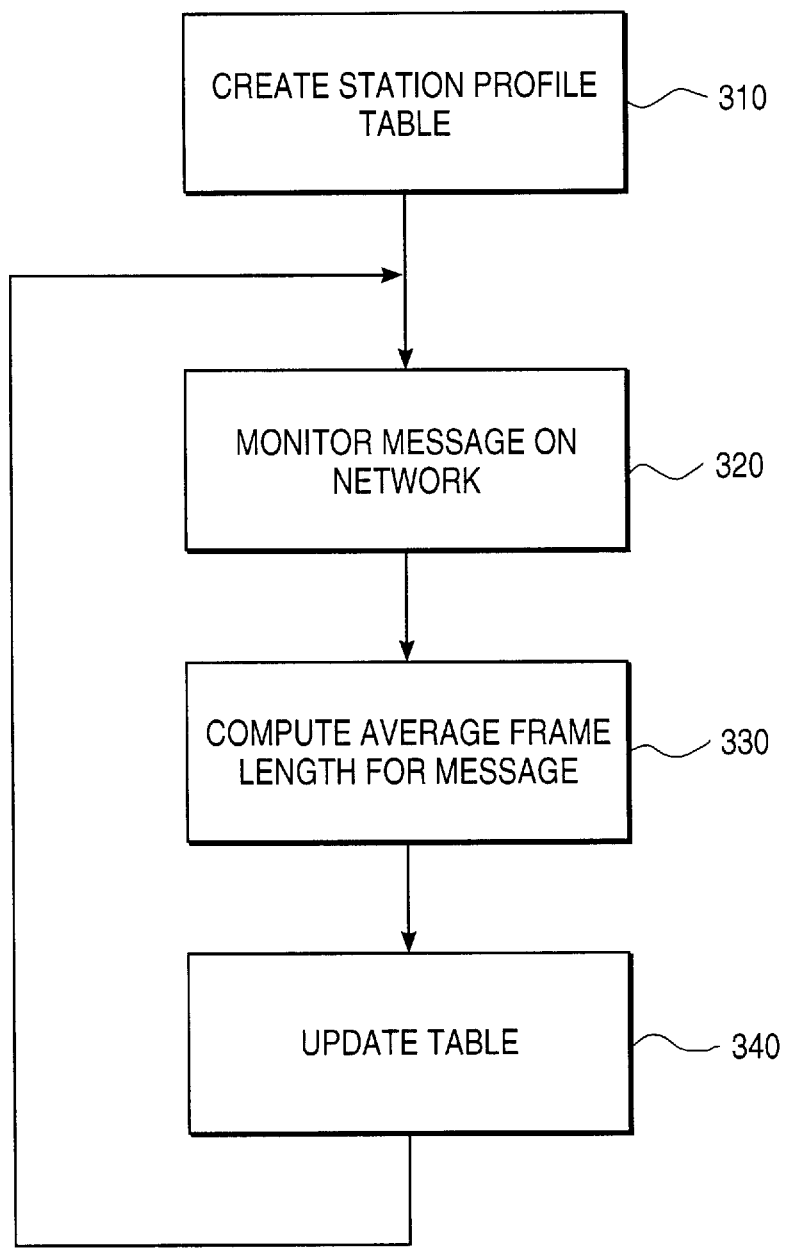
FIG. 3 is a flow chart depicting a method of maintaining a station profile table according to the present invention.

FIG. 3 is a flow chart depicting an operation of the system according to the present invention to maintain a station profile table. At a step 310, the data structure for the station profile table is created. As discussed above, the data structure is preferably a table that includes fields for holding data representing information concerning stations that are currently transmitting on the LAN. The data preferably includes a network address of each currently transmitting station, which is typically represented as a 48-bit number, a priority level, an average frame length, and, optionally, a threshold value.

Station profile tables may be maintained on each station connected to the network, or on only a single station. Where a single station profile table is maintained on a single station, the other stations still keep copies of the station profile table, but updating of the table is only done on the single station, and the updated information is transmitted to each of the other stations on the network.

The traffic monitor 240 monitors the messages on the network bus 170 at a step 320, and collects the station identification, priority level, and frame length information for each message transmitted. For each message of a given priority level that is transmitted by a particular station, an average frame length is computed at a step 330. As a frame completes transmission across the LAN, its length becomes known. The average frame length will then be calculated as a running average, where the mean frame length is recalculated as each successive frame completes transmission. The station profile table is then updated with the computed average frame length at a step 340. This process repeats by returning to the step 320 as long as messages are being transmitted on the LAN. Since the process of maintaining the station profile table is continuous, the steps shown in FIG. 3 are preferably executed in the background operation of the station 120.

Figure 4:
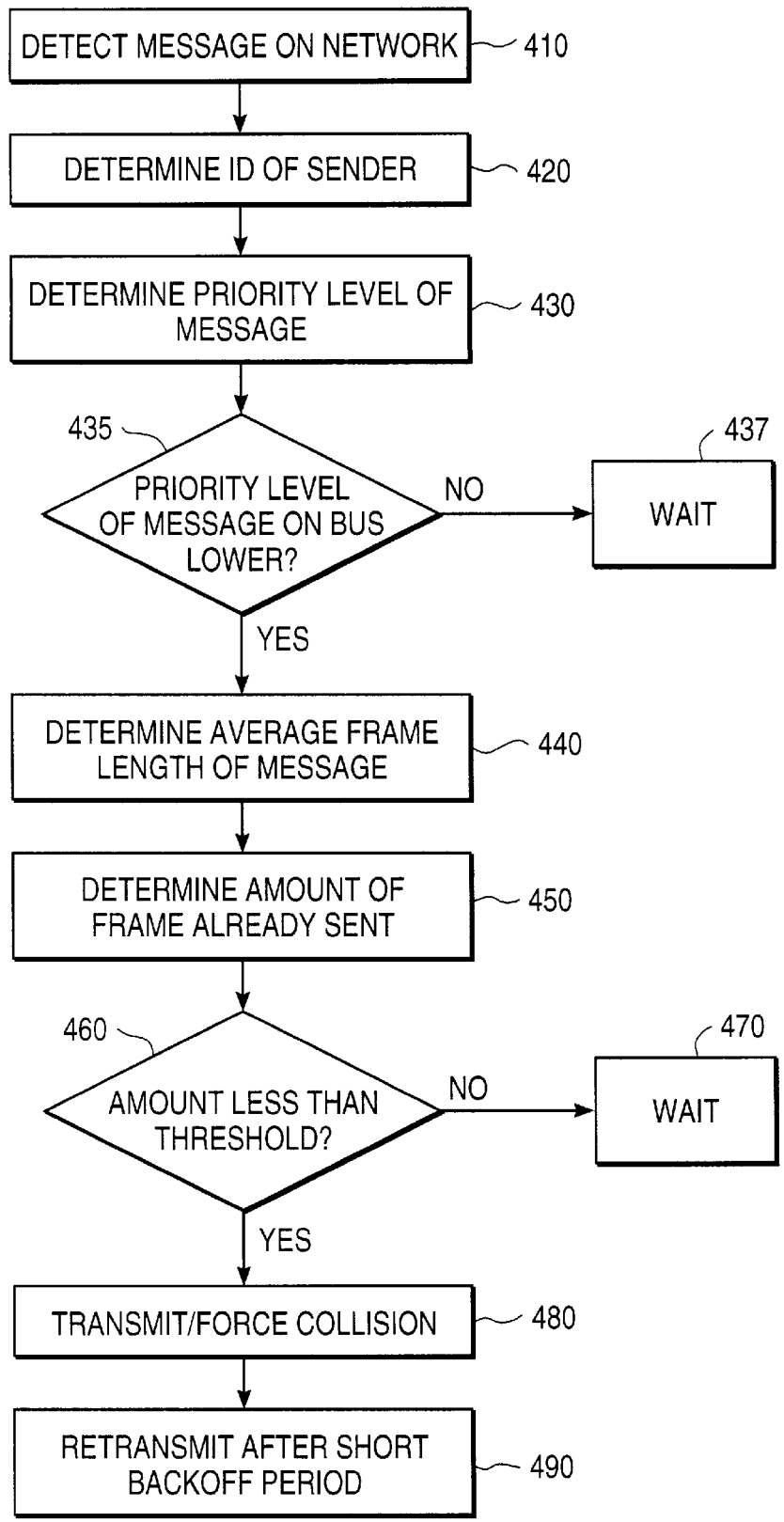
FIG. 4 is a flow chart depicting a method of preempting a low priority message according to the present invention.

Referring to FIG. 4, a process for using the station profile table to control message traffic on the network bus executes concurrently with the table maintenance operation.

When a station has a high priority message to transmit, the network interface of the station first detects if another message is being transmitted on the network at a step 410. If so, an identification of the station currently transmitting the message is determined by the traffic monitor at a step 420. At a step 430, the traffic monitor of the station desiring to transmit the high priority message determines the priority level of the message on the network bus 170.

If, at a step 435, the priority level of the message to be transmitted is lower than the priority level of the message currently being transmitted, the message to be transmitted waits, at step 437, for the current message to finish transmitting.

If, at a step 435, the priority level of the message to be transmitted is higher than the priority level of the message currently being transmitted, then, at a step 440, the station identifier and priority level of the message are used to look up an average frame length from the station profile table. The traffic monitor of the station desiring to transmit a message then determines how much of a frame has already been transmitted at a step 450. This is preferably measured in terms of a number of bytes.

The traffic monitor then determines if the portion of the frame that has already been transmitted is less than a predetermined threshold at a step 460. If the portion of the frame that has already been transmitted is greater than a predetermined threshold, the message to be transmitted waits, at step 470, for the current message to finish transmitting.

If the portion of the frame that has already been transmitted is less than a predetermined threshold, then the computing element 220 will begin transmitting the higher priority message to thereby force a collision at a step 480. As discussed above, instead of transmitting the high priority message, the computing element could alternatively send a jam signal to cause the low priority message to be aborted.

In order to insure that the higher priority message is transmitted before the lower priority message, the station with the high priority message waits for a shorter backoff period than the minimum backoff period that is defined by the CSMA/CD standard. After the shortened backoff period has elapsed, the high priority message is retransmitted. The shortened backoff period may be any length of time shorter than the agreed-upon period, and may be stored as a parameter on each station or as a parameter in the station profile table. The shorter backoff period may be implemented as a single global parameter or may be tailored to each station and/or each message priority level. In a preferred embodiment, the passage of time is monitored by the traffic monitor 240 using timing signals from the bus 170, but could alternatively be implemented using the CPU 210 having either a software or hardware clock (not shown), or any other timing mechanisms known in the art.

As noted above, if, at a step 460, it was determined that the portion of the frame already transmitted was not less than the threshold, then the station wanting to transmit the high priority message waits for the transmission of the lower priority frame to complete at a step 470. This aspect of the present invention is especially useful for improving the efficiency of network usage. For instance, referring again to Table 1, assume that Station A has already transmitted 1490 bytes of a low priority message. As seen in Table 1, the average frame length for low priority messages sent by Station A is 1500 bytes, the maximum length defined in the Ethernet specification. If a high priority message from Station C, having an average frame length of only 66 bytes, were allowed to bump Station A's low priority message, network resources would be wasted since Station A would have to retransmit the entire frame. Therefore, the time spent in retransmitting the 1490 bytes that were previously transmitted would have been wasted. With the present invention, the computing element determines that the 1490 bytes that have already transmitted represent a higher percentage of the average frame length than the 80% threshold set forth in the station profile table, and forces the higher priority message to wait for the remaining 10 bytes to transmit.

Threshold values may be stored as either a global parameter, applicable to all messages of all stations, or may be stored in the station profile table, allowing the fine tuning of threshold values for each priority level message from each station.

In alternative embodiments of the present invention, the steps of determining a station identifier, determining a priority level, determining an average frame length, and determining a length of frame already transmitted occur in various different orders, and may take place concurrently.

As can be seen from the above descriptions, the present invention provides better allocation of network resources while simultaneously allowing higher priority message to be transmitted before lower priority messages.

The embodiments of the invention in which an exclusive property or privilege is claimed are defined as follows:

1. A method for transmitting a new message from a first station on a contention-based computer network, comprising the steps of:
   (a) determining whether another message is being transmitted on the computer network by a second station;
   (b) determining a priority level of the new message to be transmitted and the other message being transmitted on the computer network;
   (c) if the priority of the new message to be transmitted is greater than the priority of the other message being transmitted on the computer network, then reading an average frame length for a message having the priority level of the other message from a station profile table;
   (d) determining an extent to which a frame of the other message has been transmitted on the computer network;
   (e) comparing the extent of transmission for the frame of the other message to the average frame length;
   (f) if the extent of transmission for the frame of the other message is below a predetermined threshold, then preempting the transmission of the frame of the other message on the computer network; and
   (g) transmitting the new message before the other message is retransmitted.

2. The method of claim 1, wherein the step of preempting the transmission of a frame of the other message comprises the steps of:
   (i) transmitting the new message on the computer network, thereby causing a collision;
   (ii) detecting, by any station connected to the computer network, that a collision has occurred;
   (iii) transmitting, by any station connected to the computer network, a jam signal;
   (iv) aborting, by the station transmitting the other message, the transmission of the other message.

3. The method of claim 1, wherein the step of preempting the transmission of a frame of the message that is currently being transmitted comprises the step of transmitting a jam signal to thereby cause a station that is transmitting the other message to abort transmission of the other message.

4. The method of claim 1, wherein the step of transmitting the new message before the other message is retransmitted comprises the steps of waiting for a backoff period that is shorter than a standard minimum backoff period; and transmitting the new message on the computer network.

5. The method of claim 1, further comprising the step of refraining from transmitting the new message until transmission of the other message is complete if the extent of transmission for the frame of the other message is above a predetermined threshold.

6. The method of claim 5, wherein the predetermined threshold comprises a percentage of the average frame length.

7. The method of claim 1, further comprising the step of determining an identity of a station that is currently transmitting the other message on the computer network; wherein the average frame length that is read from the station profile table is read based on the station identity and from a priority level of the message being transmitted on the computer network.

8. The method of claim 1, further comprising the steps of monitoring a length of each frame for each message sent by each station on the computer network having a given priority level; and updating the station profile table.

9. A computer system for transmitting and receiving messages on a contention-based computer network, the messages comprising sequences of frames, each message having a priority level associated therewith, the system comprising:
   (a) a network interface for transmitting and receiving messages from the computer network;
   (b) a traffic monitor for:
      (i) determining whether another message is currently being transmitted on the computer network by a first station;
      (ii) determining a priority level of the message currently being transmitted on the computer network; and
      (iii) determining an extent to which a frame of the other message has been transmitted; and (c) a processor for:
- (i) determining a priority level for a new message to be transmitted on the computer network;
- (ii) comparing the priority levels of the other message currently being transmitted on the network by a first station and the new message to be transmitted on the computer network by the computer system;
- (iii) reading an average frame length for messages having the same priority level as the other message currently being transmitted if the priority level of the new message to be transmitted on the computer network is greater than the priority level of the other message currently being transmitted;
- (iv) preempting the transmission of the frame of the other message currently being transmitted if the extent of transmission of the frame of the other message is less than a predetermined threshold; and
- (v) transmitting the new message on the computer network before the other message is retransmitted.

10. The system of claim 9, wherein the processor is further for preventing a new message from transmitting before the frame of the other message that is currently transmitting on the computer network has completed transmitting if the extent of transmission of the frame of the other message is greater than a predetermined threshold.

11. The system of claim 9, wherein the transmitting of the new message before the other message is retransmitted comprises the step of transmitting the new message after waiting for a backoff period that is shorter than a standard minimum backoff period.

12. The system of claim 9, further comprising a memory that stores a station profile table that associates average frame lengths with messages having a given priority levels from given stations.

13. The system of claim 9, farther comprising means for updating the average frame length for a message having a given priority level.

* * * * *